(12) United States Patent
Yoon et al.

(10) Patent No.: US 11,876,198 B2
(45) Date of Patent: Jan. 16, 2024

(54) SECONDARY BATTERY

(71) Applicant: LG Chem, Ltd., Seoul (KR)

(72) Inventors: U Jin Yoon, Daejeon (KR); Ha Young Heo, Daejeon (KR)

(73) Assignee: LG Energy Solution, Ltd.

( * ) Notice: Subject to any disclaimer, the term of this patent is extended or adjusted under 35 U.S.C. 154(b) by 430 days.

(21) Appl. No.: 17/058,766

(22) PCT Filed: Nov. 8, 2019

(86) PCT No.: PCT/KR2019/015126
§ 371 (c)(1),
(2) Date: Nov. 25, 2020

(87) PCT Pub. No.: WO2020/105916
PCT Pub. Date: May 28, 2020

(65) Prior Publication Data
US 2021/0203019 A1   Jul. 1, 2021

(30) Foreign Application Priority Data
Nov. 20, 2018  (KR) .......................... 10-2018-0143697

(51) Int. Cl.
*H01M 10/643*  (2014.01)
*H01M 10/04*  (2006.01)
*H01M 10/613*  (2014.01)
*H01M 10/653*  (2014.01)
(Continued)

(52) U.S. Cl.
CPC ..... *H01M 10/643* (2015.04); *H01M 10/0422* (2013.01); *H01M 10/613* (2015.04);
(Continued)

(58) Field of Classification Search
CPC .......... H01M 10/643; H01M 10/0422; H01M 10/613; H01M 10/653; H01M 10/654;
(Continued)

(56) References Cited

U.S. PATENT DOCUMENTS

2007/0015046 A1 *  1/2007  Kim .................... H01M 50/171
                                                               429/185
2007/0053156 A1    3/2007  Regenfus
(Continued)

FOREIGN PATENT DOCUMENTS

CN        1956249 A     5/2007
CN      102422480 A     4/2012
(Continued)

OTHER PUBLICATIONS

Search report from International Application No. PCT/KR2019/015126, dated Feb. 19, 2020.

*Primary Examiner* — Muhammad S Siddiquee
(74) *Attorney, Agent, or Firm* — Lerner David LLP

(57) ABSTRACT

A secondary battery according to the present invention, in which an electrode assembly is built in a cylindrical can, a top cap connected to a positive electrode of the electrode assembly is coupled to an upper end of the can, and the can is connected to a negative electrode. The secondary battery includes a cooling member which receives heat generated in the electrode assembly to release the heat and is coupled to a lower portion of the can, wherein the cooling member has a plurality of cooling pins disposed parallel to each other.

10 Claims, 7 Drawing Sheets

(51) Int. Cl.
  *H01M 10/654* (2014.01)
  *H01M 10/6551* (2014.01)

(52) U.S. Cl.
  CPC ....... *H01M 10/653* (2015.04); *H01M 10/654* (2015.04); *H01M 10/6551* (2015.04)

(58) Field of Classification Search
  CPC ........... H01M 10/6551; H01M 50/107; H01M 10/04; H01M 10/0431; Y02P 70/50; Y02E 60/10
  See application file for complete search history.

(56) References Cited

U.S. PATENT DOCUMENTS

| | | |
|---|---|---|
| 2012/0021260 A1 | 1/2012 | Yasui et al. |
| 2012/0094160 A1 | 4/2012 | Lee et al. |
| 2014/0045041 A1 | 2/2014 | Kim et al. |
| 2015/0072191 A1 | 3/2015 | Lee et al. |
| 2016/0301118 A1 | 10/2016 | Chami et al. |

FOREIGN PATENT DOCUMENTS

| | | | |
|---|---|---|---|
| CN | 106711512 B | | 3/2019 |
| EP | 2530778 A1 | | 12/2012 |
| JP | H10214605 A | | 8/1998 |
| JP | 2002056822 A | | 2/2002 |
| JP | 2002270148 A | | 9/2002 |
| JP | 2005251512 A | * | 9/2005 |
| JP | 2005251512 A | | 9/2005 |
| JP | 2007012486 A | | 1/2007 |
| JP | 2007512683 A | | 5/2007 |
| JP | 4164212 B2 | | 10/2008 |
| JP | 2010087170 A | | 4/2010 |
| JP | 4586339 B2 | | 11/2010 |
| JP | 2011187275 A | | 9/2011 |
| JP | 2011222972 A | | 11/2011 |
| JP | 2012195187 A | | 10/2012 |
| JP | 2014089839 A | | 5/2014 |
| JP | 2014216137 A | | 11/2014 |
| JP | 2014216137 A | * | 11/2014 |
| JP | 6438003 B2 | | 12/2018 |
| KR | 100696784 B1 | | 3/2007 |
| KR | 100778978 B1 | | 11/2007 |
| KR | 20110118807 A | | 11/2011 |
| KR | 101182274 B1 | | 9/2012 |
| KR | 101473392 B1 | | 12/2014 |
| KR | 101571774 B1 | | 11/2015 |
| KR | 101837512 B1 | | 3/2018 |
| KR | 101904894 B1 | | 10/2018 |

* cited by examiner

SECONDARY BATTERY

CROSS-REFERENCE TO RELATED APPLICATION

The present application is a national phase entry under 35 U.S.C. § 371 of PCT/KR2019/015126, filed on Nov. 8, 2019, and claims the benefit of the priority of Korean Patent Application No. 10-2018-0143697, filed on Nov. 20, 2018, which are hereby incorporated by reference in their entirety herein.

TECHNICAL FIELD

The present invention relates to a cylindrical type secondary battery, and more particularly, to a secondary battery comprising a cooling member to improve cooling performance.

BACKGROUND ART

Secondary batteries, which are widely used in various digital devices and transport means such as vehicles are repeatedly chargeable and dischargeable. Also, research and development are continuously carried out to increase efficiency and improve safety.

Secondary batteries may be variously classified according to a shape of battery case or a material of an electrode assembly, but the secondary batteries are most widely manufactured in a cylindrical type, a prismatic type, and a pouch type according to a shape of a battery case.

Among them, in the cylindrical type secondary battery, an electrode assembly 30' is built in a cylindrical can 10', which has an opened upper side and is empty, and a top cap 20' is coupled to an upper end of the can 10'. Referring to FIG. 1 that is a cross-sectional view illustrating an internal configuration of the cylindrical type secondary battery according to the related art, the can 10' is connected to an electrode assembly 30' through a negative electrode tab 60' at a lower end thereof, and the top cap 20' is connected to the electrode assembly 30' through a positive electrode tab 40'. Also, the positive electrode tab 40' and the negative electrode tab 60' are disposed with an insulator therebetween or insulated so as to be electrically insulated from each other.

Furthermore, the general cylindrical type secondary battery has a structure in which a safety vent that is broken to discharge a gas when an internal gas pressure increases so as to suppress an occurrence of explosion and ignition, a PTC device that interrupts current at a high temperature, a current interrupt device (CID) that interrupts current when an internal pressure of the battery increases, and the like are additionally mounted in the top cap.

Secondary batteries mounted in devices, which require high rotation of a motor, such as quick boards, electric drills, vacuum cleaners, and the like are designed so that high current flows. However, as the high current flows, heat is inevitably generated in an electrode assembly 30'.

For example, when the battery is discharged at current of 10 A or more at room temperature, the electrode assembly 30' increases in temperature by about 40° C. or more by resistance, the resistance also increases as the temperature increases. Thus, it may be difficult to maintain the discharge of the high current.

Therefore, research and development has been made to lower the basic resistance of the electrode assembly, but there is a limitation in only lowering the resistance of the electrode and component.

DISCLOSURE OF THE INVENTION

Technical Problem

Accordingly, to solve the above problem, a main objective of the present invention is to provide a secondary battery in which heat generated when high current is discharged is capable of being more quickly and efficiently cooled.

Technical Solution

According to the present invention for achieving the above objective, a secondary battery, in which an electrode assembly is built in a cylindrical can, a top cap connected to a positive electrode of the electrode assembly is coupled to an upper end of the can, and the can is connected to a negative electrode, comprises: a cooling member, which is configured to receive heat generated in the electrode assembly and to release the heat, is coupled to a lower portion of the can, wherein the cooling member comprises a plurality of cooling pins disposed parallel to each other.

Also, in Embodiment 1 of the present invention, the cooling pins may be disposed in a direction parallel to a longitudinal direction of the can, and a bottom surface of the can may be provided in a plane that is perpendicular to the longitudinal direction of the can.

In Embodiment 2 of the present invention, the bottom surface of the can may gradually increase in height from an edge of the bottom surface toward a center of the bottom surface.

Here, the electrode assembly may have a shape in which a portion of the electrode assembly contacting the bottom surface of the can is concavely recessed to correspond to the shape of the bottom surface of the can and be built in the can to fill a recessed space formed by the shape of the bottom surface of the can.

In the cooling pins formed on the cooling member to correspond to the shape of the bottom surface of the can, the cooling pins disposed at the edge of the bottom surface of the can may have a relatively short length, and the cooling pins gradually increase in length toward a center of the bottom surface of the can.

The electrode assembly may have a through-hole that is punched in the center in the longitudinal direction of the can, and the cooling member may comprise a center rod inserted into the through-hole.

A negative electrode of the electrode assembly may be electrically connected to the center rod, and the center rod may be electrically connected to the can. Here, the negative electrode of the electrode assembly may be electrically connected to an upper end of the center rod.

In Embodiment 3 of the present invention, one of the cooling pins may have a diameter greater than that of all of the other cooling pins. Here, the cooling pin having the diameter greater than that of all of the other pins may be disposed at a position corresponding to the center of the bottom surface of the can.

The cooling pin (having the diameter greater than that of all of the other pins) may have a length that protrudes further downward from all of the other cooling pins and thus may be used as a negative electrode terminal.

Furthermore, in the present invention, the cooling member may have the same thermal conductivity as the can or be made of a material having thermal conductivity greater than that of the can.

Advantageous Effects

The present invention having the above-described constituents may have the effect in which the cooling member having the plurality of cooling pins are coupled to the lower portion of the can to more quickly release the heat generated in the electrode assembly.

Since the bottom surface of the can has the shape of which the height gradually increases from the edge toward the center, the shape deformation may be prevented when the swelling occurs due to the heat generation (the deformation of the can due to the internal pressure may be prevented). The electrode assembly may have the shape of filling the recessed space formed by the shape of the bottom surface of the can, which corresponds to the shape of the bottom surface of the can, to increase in capacity.

Furthermore, in the electrode assembly, the through-hole may be punched in the center in the longitudinal direction of the can, and the cooling member may comprise the center rod inserted into the through-hole. As a result, the heat generated in the electrode assembly may be more efficiently released to the outside.

The negative electrode tab of the electrode assembly may be electrically connected to the center rod, and thus, the center rod may be electrically connected to the can. Also, one of the cooling pins may have a diameter greater than that of the other cooling pin. Here, the cooling pin having the larger diameter may be formed at the position corresponding to the center of the bottom surface of the can, and thus, the cooling pin may be used as the negative electrode terminal.

MODE FOR CARRYING OUT THE INVENTION

Figure 1:
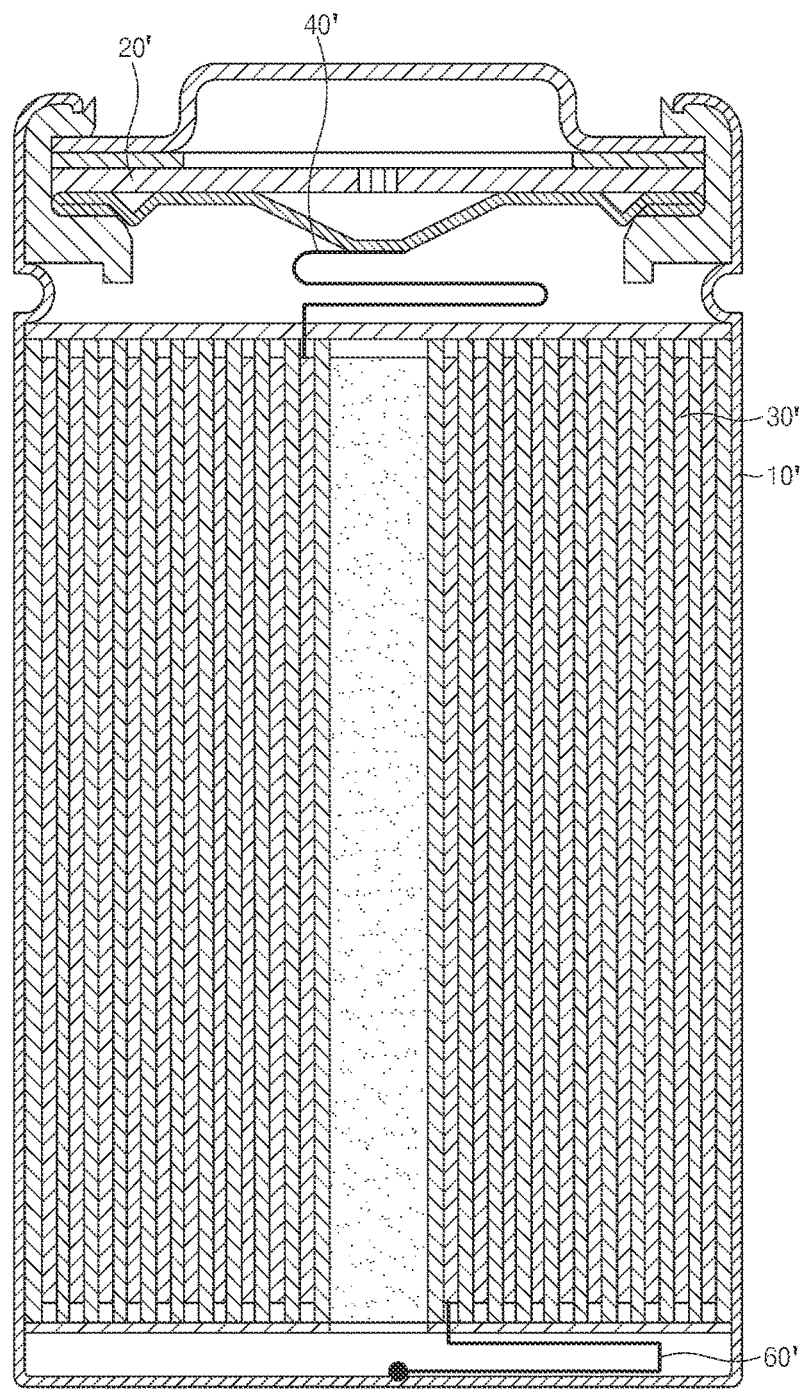
FIG. 1 is a cross-sectional view illustrating an internal configuration of a cylindrical type secondary battery according to the related art.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly illustrate the present invention, parts that are not related to the description are omitted, and the same or similar components are denoted by the same reference numerals throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to a cylindrical type secondary battery in which an electrode assembly 30 is mounted within a cylindrical can 10. A top cap 20 connected to a positive electrode tab 40 of the electrode assembly 30 is coupled to an upper end of the can 10, and the can is connected to a negative electrode tab 60. Also, a cooling member 50 is mounted at a lower portion (a side opposite to the top cap) of the can 10. Hereinafter, embodiments of the present invention will be described in more detail with reference to the accompanying drawings.

Embodiment 1

Figure 2:
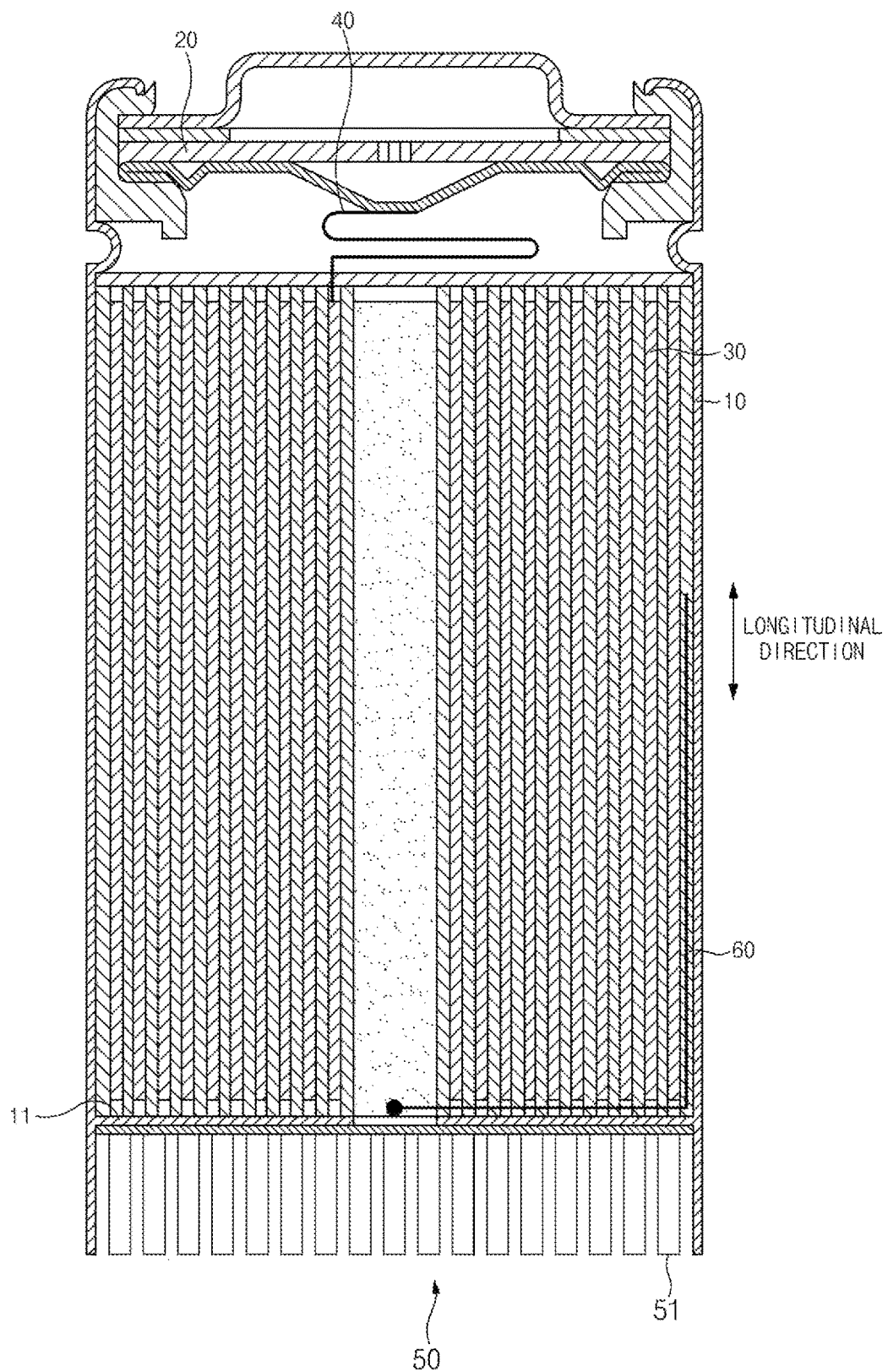
FIG. 2 is a cross-sectional view illustrating an internal configuration of a secondary battery according to Embodiment 1 of the present invention.
Figure 3:
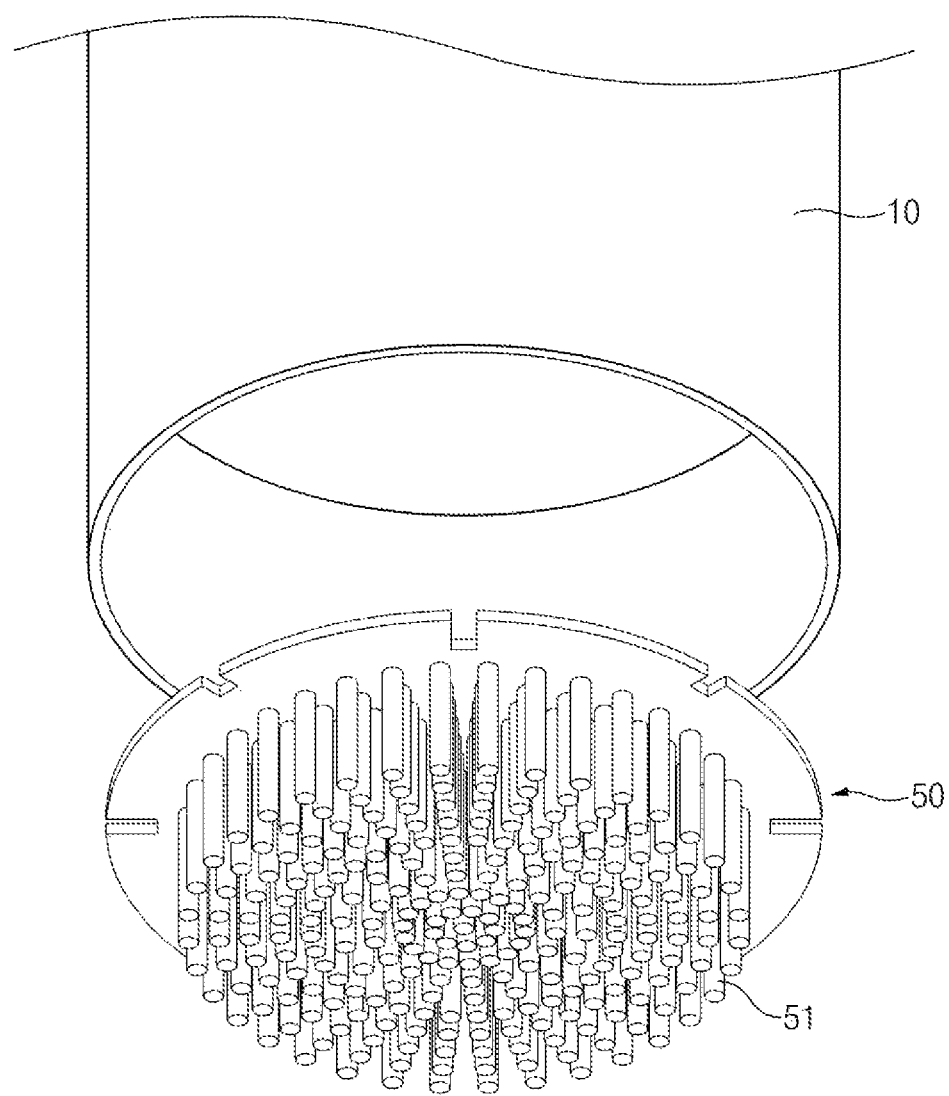
FIG. 3 is a perspective view illustrating a state in which a cooling member is separated from the secondary battery according to Embodiment 1 of the present invention.

FIG. 2 is a cross-sectional view illustrating an internal configuration of a secondary battery according to Embodiment 1 of the present invention, and FIG. 3 is a perspective view illustrating a state in which a cooling member is separated from the secondary battery according to Embodiment 1 of the present invention.

Referring to the drawings, a cooling member 50, which receives heat generated in an electrode assembly 30 and a can 10 to release the heat, is mounted on a lower portion of the can 10.

The cooling member 50 has a circular plate shape with a predetermined diameter to be mounted on a bottom surface 11 of the can 10. A plurality of cooling pins 51 disposed parallel to each other on a surface opposite to the surface attached to the bottom surface 11 of the can 10 protrude from the cooling member 50. Here, the cooling member 50 may have the same thermal conductivity as the can 10 or be made of a material having thermal conductivity greater than that of the can 10.

The cooling pins 51 serve to increase in contact area with air by allowing the cooling member 50 to increase in entire surface area, thereby increasing in heat dissipation.

As illustrated in the drawings, the cooling pins 51 are disposed in a direction (vertical direction) parallel to a longitudinal direction (vertical direction in FIG. 2) of the can 10. The bottom surface 11 of the can 10 forms a plane perpendicular to the longitudinal direction of the can 10.

Embodiment 2

Figure 4:
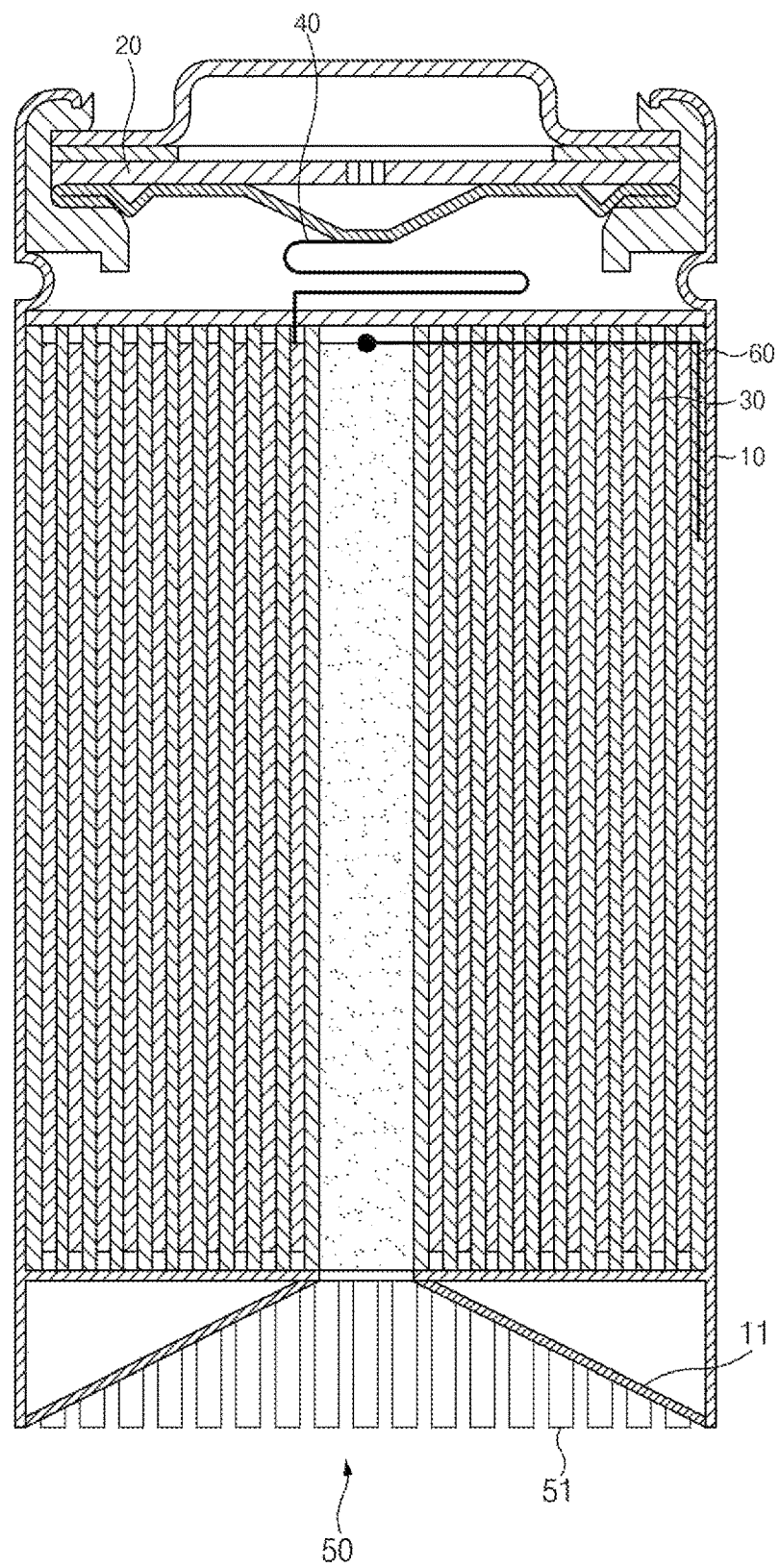
FIGS. 4 and 5 are cross-sectional views illustrating an internal configuration of a secondary battery according to Embodiment 2 of the present invention.
Figure 5:
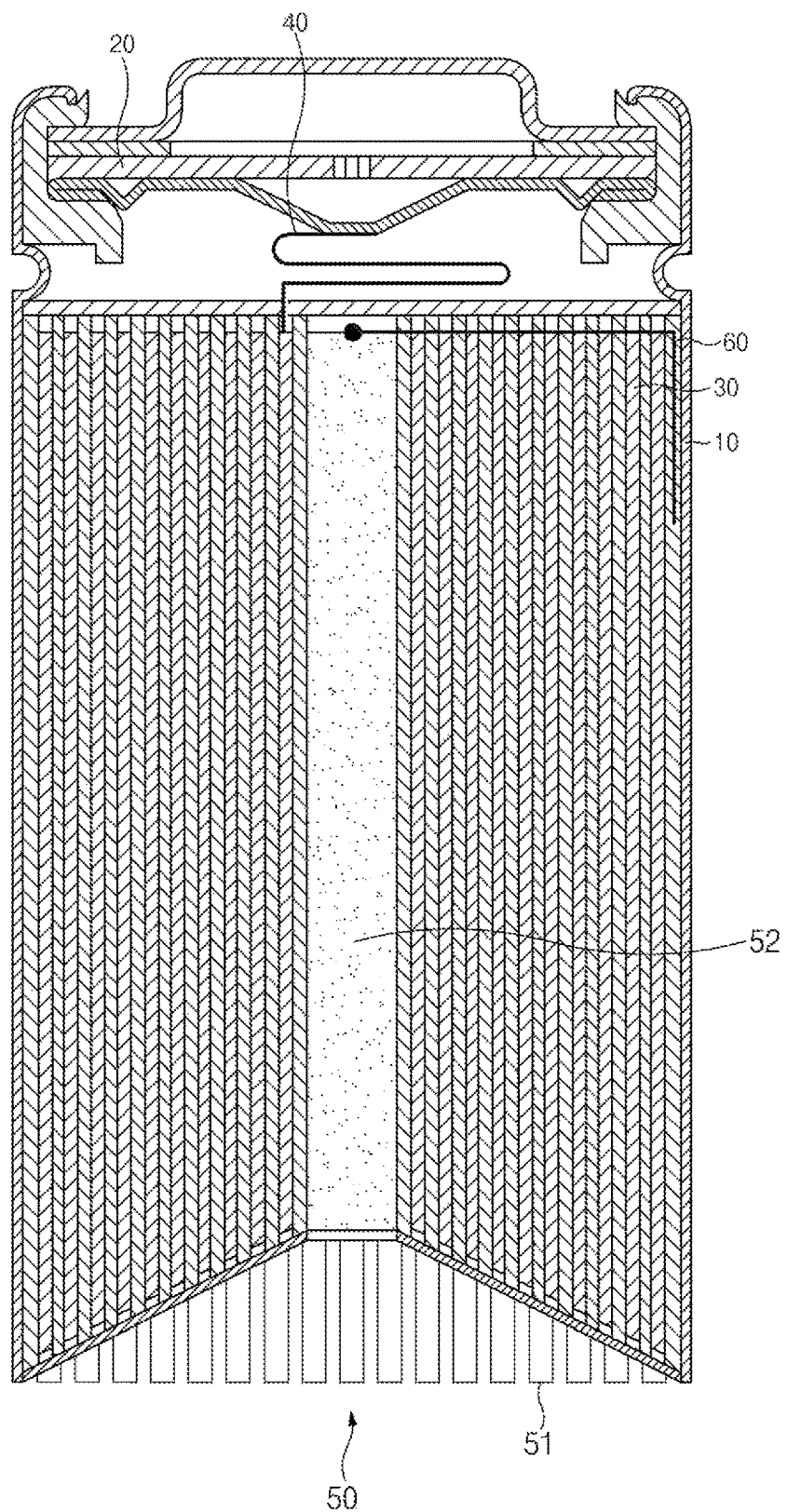
Figure 6:
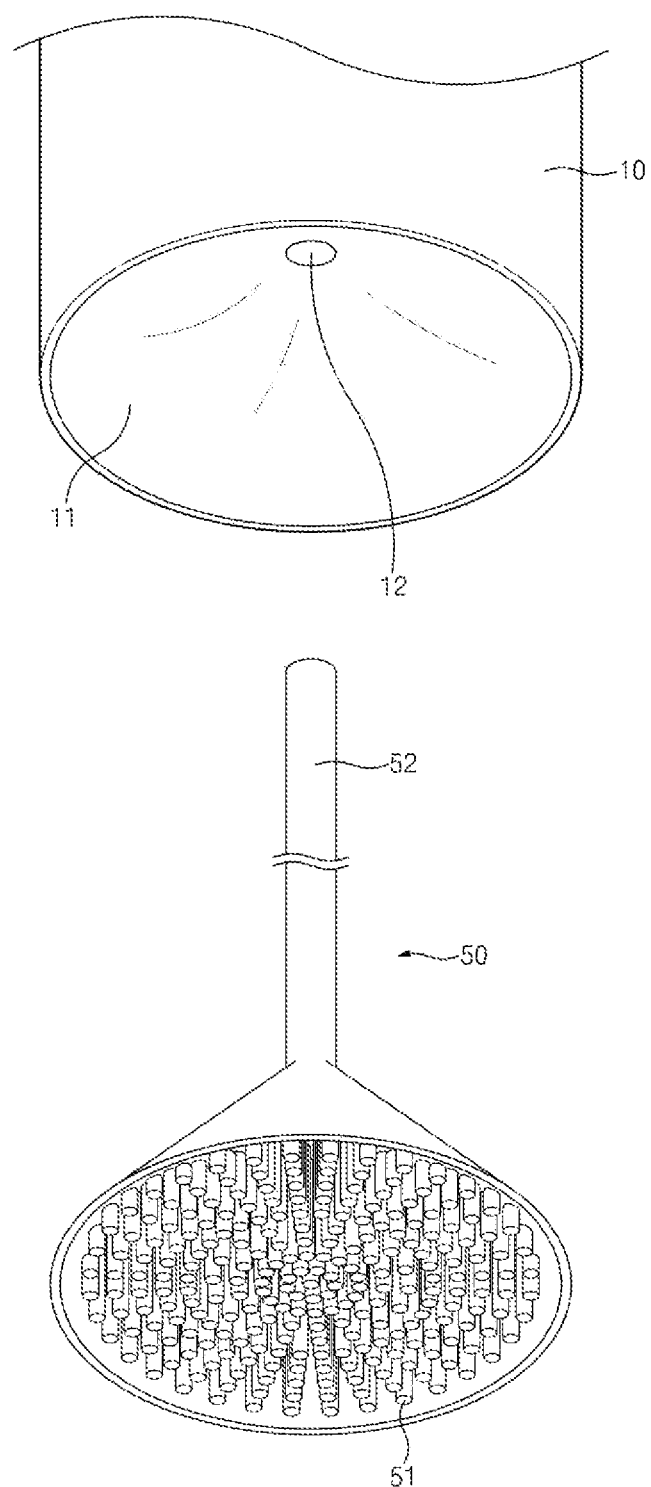
FIG. 6 is a perspective view illustrating a state in which a cooling member is separated from the secondary battery according to Embodiment 2 of the present invention.

FIGS. 4 and 5 are cross-sectional views illustrating an internal configuration of a secondary battery according to Embodiment 2 of the present invention. Here, FIG. 4 illustrates a state in which an electrode assembly 30 has a flat bottom surface, and FIG. 5 illustrates a state in which the electrode assembly 30 has a shape of filling a recessed space corresponding to a shape of a bottom surface 11 of a can 10. Also, FIG. 6 is a perspective view illustrating a state in which a cooling member is separated from the secondary battery according to Embodiment 2 of the present invention.

In this embodiment, the bottom surface 11 of the can 10 has a shape that gradually increases in height from an edge of the bottom surface 11 toward a center, i.e., is concavely recessed upward.

As described above, the shape in which the bottom surface 11 is concavely recessed may increase in robustness to suppress deformation of the can 10 due to an increase in internal pressure. That is, the structure having the concavely recessed shape such as a bottom surface of a beverage can containing carbonated beverage may provide stability to maximally suppress the deformation of the can 10 (when an internal electrolyte is evaporated by heat generation to increase in internal pressure).

Furthermore, a space formed by the shape of the bottom surface 11 of the can 10 may be configured so that a lower portion of the electrode assembly 30 is expanded to be filled as illustrated in FIG. 5. That is, in this embodiment, the electrode assembly 30 may have a flat bottom surface as illustrated in FIG. 4, like the shape according to the related art. Alternatively, as illustrated in FIG. 5, the electrode assembly 30 may have a shape in which a portion contacting the bottom surface 11 of the can 10 is concavely recessed to correspond to the shape of the bottom surface 11 of the can 10.

Here, when the electrode assembly 30 fills the recessed space formed by the shape of the bottom surface 11 of the can 10, the electrode assembly 30 may increase in capacity, as well as, a contact area between the electrode assembly 30 and the can 10 may increase to more facilitate thermal conduction. Particularly, the portion of the electrode 30, which fills the recessed space may directly contact the cooling member 50 (with the bottom surface of the can therebetween) to more quickly release heat generated in the electrode assembly 30.

Also, in this embodiment, in the cooling pins 51 formed on the cooling member 50 to correspond to the shape of the bottom surface 11 of the can 10 so that the bottom (i.e., the bottom of the can) of the secondary is maintained in the flat state as illustrated in FIG. 5, the cooling pin 51 disposed on an edge of the bottom surface 11 of the can 10 may have a relatively short length, and also the cooling pins 51 may gradually increase in length toward the center of the bottom surface 11 of the can 10.

Furthermore, the electrode assembly 30 has a through-hole (into which the center rod is inserted in FIGS. 4 and 5) that is punched in the center of the can 10 in the longitudinal direction, and the cooling member 50 comprises a center rod 52 inserted into the through-hole.

The center rod 52 enters the hole 12 that is punched in the bottom surface 11 of the can 10 and then is inserted into the through-hole. Here, the center rod 52 enters a height at which the center rod 52 does not interfere with a positive electrode tab 40. Since the center rod 52 is disposed at the center of the electrode assembly 30, the heat generated in the electrode assembly 30 may be more quickly conducted to the cooling member 50 that is disposed therebelow.

In this embodiment, since it is difficult to weld a negative electrode tab 60 to the bottom surface of the can 10 because the bottom surface 11 of the can 10 is not flat, the negative electrode tab 60 is welded to the center rod 52.

Embodiment 3

Figure 7:
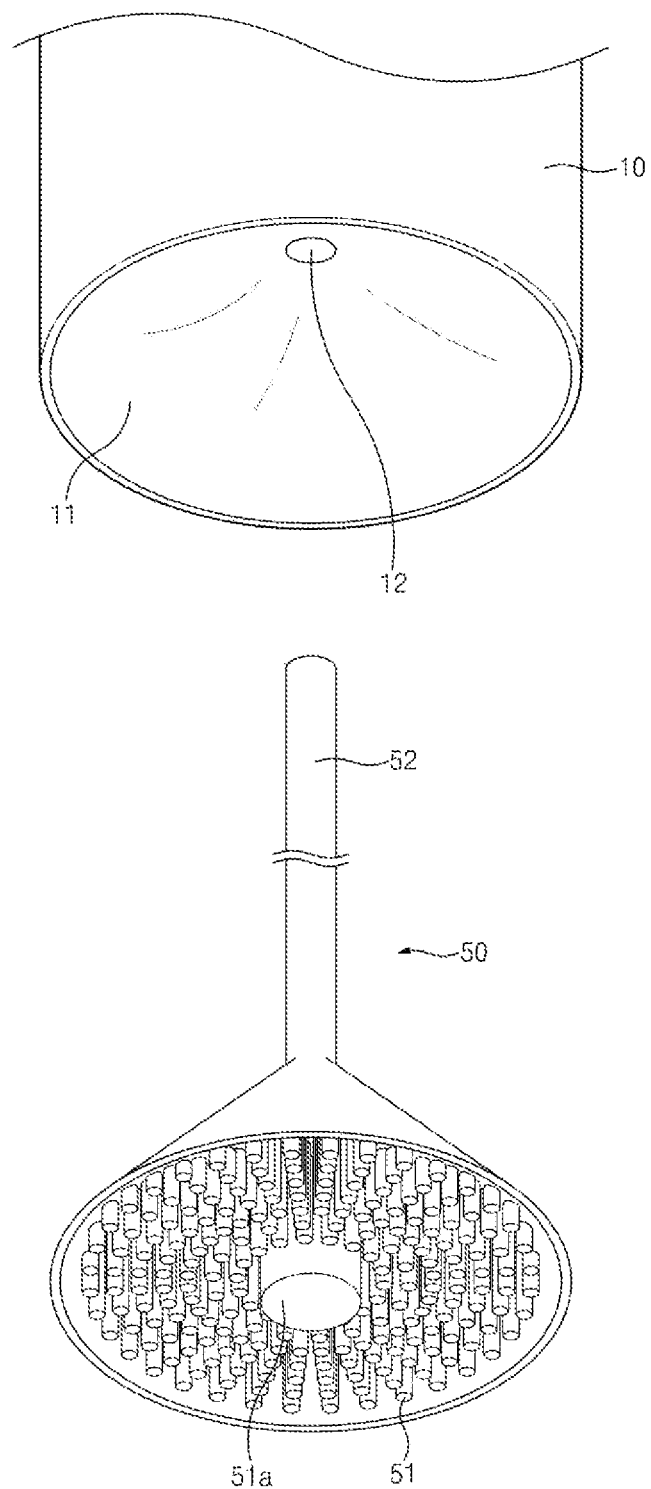
FIG. 7 is a perspective view illustrating a state in which a cooling member is separated from a secondary battery according to Embodiment 3 of the present invention.

FIG. 7 is a perspective view illustrating a state in which a cooling member is separated from a secondary battery according to Embodiment 3 of the present invention.

A secondary battery according to Embodiment 3 of the present invention has the same structure as that according to Embodiment 2 except that one of the cooling pins 51 has a diameter greater than that of each of other cooling pins.

Here, the cooling pin 51*a* having the larger diameter is disposed at a position corresponding to a center of a bottom surface 11. Since the cooling pin 51*a* has a length that protrudes further downward than each of other cooling pins 51, the cooling pin 51*a* may be used as a negative electrode terminal (electrically connected to an external device).

The present invention having the above-described constituents may have the effect in which a cooling member 50 having the plurality of cooling pins 51 are coupled to a lower portion of the can 10 to more quickly release the heat generated in the electrode assembly 30.

Since the bottom surface 11 of the can 10 has a shape that gradually increases in height from an edge to a center of the bottom surface 11, the structural robustness may increase to prevent shape deformation from occurring when swelling occurs due to heat generation.

Also, the electrode assembly 30 may have a shape that fills a recessed space formed by the shape of the bottom surface of the can to correspond to the shape of the bottom surface 11 of the can 10, thereby increasing in capacity. In addition, a contact area between the electrode assembly and the can may increase to increase in conductivity, thereby improving cooling performance.

Furthermore, in the electrode assembly 30, the through-hole may be punched in the center in a longitudinal direction of the can 10, and the cooling member 50 may comprise a center rod 52 inserted into the through-hole. As a result, the heat generated in the electrode assembly 30 may be more efficiently released to the outside.

A negative electrode tab 60 of the electrode assembly 30 is electrically connected to the center rod 52, and thus, the center rod 52 is electrically connected to the can 10. Also, one 51a of the cooling pins 51 may have a diameter greater than that of the other cooling pin. Here, the cooling pin 51*a* having the larger diameter may be formed at a position corresponding to the center of the bottom surface of the can, and thus, the cooling pin 51*a* may be used as a negative electrode terminal. Also, since the cooling pin 51*a* to be used as the negative electrode terminal more increases in diameter, resistance may be reduced to more facilitate the heat release.

Also, when the cooling pin 51*a* increases in diameter, a contact area with an external terminal may increase to significantly facilitate the contact with a terminal of a charging/discharging device when the secondary battery is charged and discharged.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A secondary battery in which an electrode assembly is built in a cylindrical can, a top cap connected to a positive electrode of the electrode assembly is coupled to an upper end of the can, and the can is connected to a negative electrode, the secondary battery comprising:
    a cooling member, which is configured to receive heat generated in the electrode assembly and to release the heat, is coupled to a lower portion of the can,
    wherein the cooling member comprises a plurality of cooling pins disposed parallel to each other and in a direction parallel to a longitudinal direction of the can,
    wherein a bottom surface of the can gradually increases in height from an edge of the bottom surface toward a center of the bottom surface.

2. The secondary battery of claim 1, wherein the electrode assembly has a shape in which a portion of the electrode assembly contacting the bottom surface of the can is concavely recessed to correspond to a shape of the bottom surface of the can and is built in the can to fill a recessed space formed by the shape of the bottom surface of the can.

3. The secondary battery of claim 1, wherein, the cooling pins disposed at the edge of the bottom surface of the can have a relatively short length, and the cooling pins gradually increase in length toward a center of the bottom surface of the can.

4. The secondary battery of claim 3, wherein the electrode assembly has a through-hole that is punched in the center in the longitudinal direction of the can, and
the cooling member comprises a center rod inserted into the through-hole.

5. The secondary battery of claim 4, wherein a negative electrode of the electrode assembly is electrically connected to the center rod, and
the center rod is electrically connected to the can.

6. The secondary battery of claim 5, wherein the negative electrode of the electrode assembly is electrically connected to an upper end of the center rod.

7. The secondary battery of claim 6, wherein one of the cooling pins has a diameter greater than all other cooling pins.

8. The secondary battery of claim 7, wherein the cooling pin having the diameter greater than that of all the other pins protrudes further downward than the all of the other cooling pins.

9. The secondary battery of claim 7, wherein the cooling pin having the diameter greater than that of all of the other cooling pins is disposed at a position corresponding to the center of the bottom surface of the can.

10. The secondary battery of claim 1, wherein the cooling member has a thermal conductivity equal to the can or is made of a material having thermal conductivity greater than that of the can.

* * * * *